United States Patent [19]

Leshner et al.

[11] E Re. 29,978

[45] Reissued May 1, 1979

[54] FUEL VAPOR INJECTOR AND IGNITER SYSTEM FOR INTERNAL COMBUSTION ENGINES

[75] Inventors: Ervin Leshner; Michael D. Leshner, both of Cherry Hill, N.J.

[73] Assignee: Fuel Injection Development Corporation, Bellmawr, N.J.

[21] Appl. No.: 780,404

[22] Filed: Mar. 23, 1977

Related U.S. Patent Documents

Reissue of:

[64] Patent No.: 3,926,169
Issued: Dec. 16, 1975
Appl. No.: 481,702
Filed: Jun. 21, 1974

[51] Int. Cl.[2] ..... F02B 19/10; F02B 19/18

[52] U.S. Cl. ..... 123/32 SJ; 123/32 SP; 123/32 J

[58] Field of Search ..... 123/32 JV, 32 SJ, 32 ST, 123/32 SP, 75 B, 191 S, 191 SP, 32 VN, 143 B, 32 AH, 32 J

[56] References Cited

U.S. PATENT DOCUMENTS

| | | | |
|---|---|---|---|
| 978,969 | 12/1910 | Webber | 123/143 B |
| 1,310,970 | 7/1919 | Stroud | 123/32 SJ |
| 1,700,603 | 1/1929 | Vreeland | 123/143 B |
| 2,034,855 | 3/1936 | Alby | 123/32 SJ |
| 2,141,435 | 12/1938 | Hansen et al. | 123/34 A |
| 2,173,081 | 9/1939 | Barkeij | 123/191 SP |
| 2,391,220 | 12/1945 | Beeh | 123/32 SJ |
| 2,441,277 | 5/1948 | Lamphere | 123/32 SJ |
| 2,963,014 | 12/1960 | Voelcker | 123/32 SJ |
| 3,066,662 | 12/1962 | May | 123/143 B |
| 3,173,409 | 3/1965 | Warren | 123/32 SJ |
| 3,406,667 | 10/1968 | Evans et al. | 123/32 SJ |
| 3,908,625 | 9/1975 | Romy | 123/32 SJ |

FOREIGN PATENT DOCUMENTS

| | | | |
|---|---|---|---|
| 907003 | 7/1949 | Fed. Rep. of Germany | 123/32 SJ |
| 640927 | 7/1928 | France | 123/320 SJ |
| 425151 | 11/1942 | Italy | 123/32 SJ |
| 637584 | 5/1950 | United Kingdom | 123/32 SJ |

*Primary Examiner*—Ronald B. Cox
*Attorney, Agent, or Firm*—Woodcock, Washburn, Kurtz & Mackiewicz

[57] ABSTRACT

A combined fuel vapor injector and igniter system for internal combustion engines and method of operating the engine therewith in which liquid fuel enters an injector-igniter device, is vaporized using the engine's heat of combustion, and exits in vapor form into the engine combustion chamber where it mixes with air or an air-fuel mixture which has entered through an intake valve, or port, and the resulting air-fuel mixture is ignited. The system assures reliable ignition, so that engines may be run at leaner than stoichiometric air-fuel ratios to take advantage of increased fuel economy, and reduced emissions of the oxides of nitrogen hydrocarbons and carbon monoxide. Power output equalization is attained between cylinders.

35 Claims, 9 Drawing Figures

Fig. 9
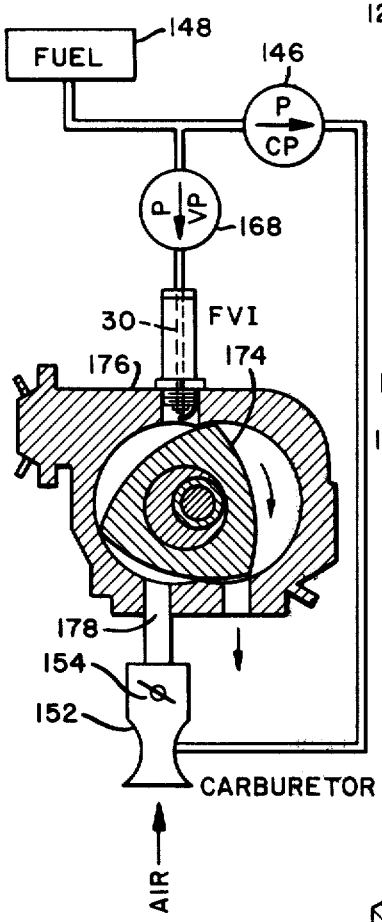
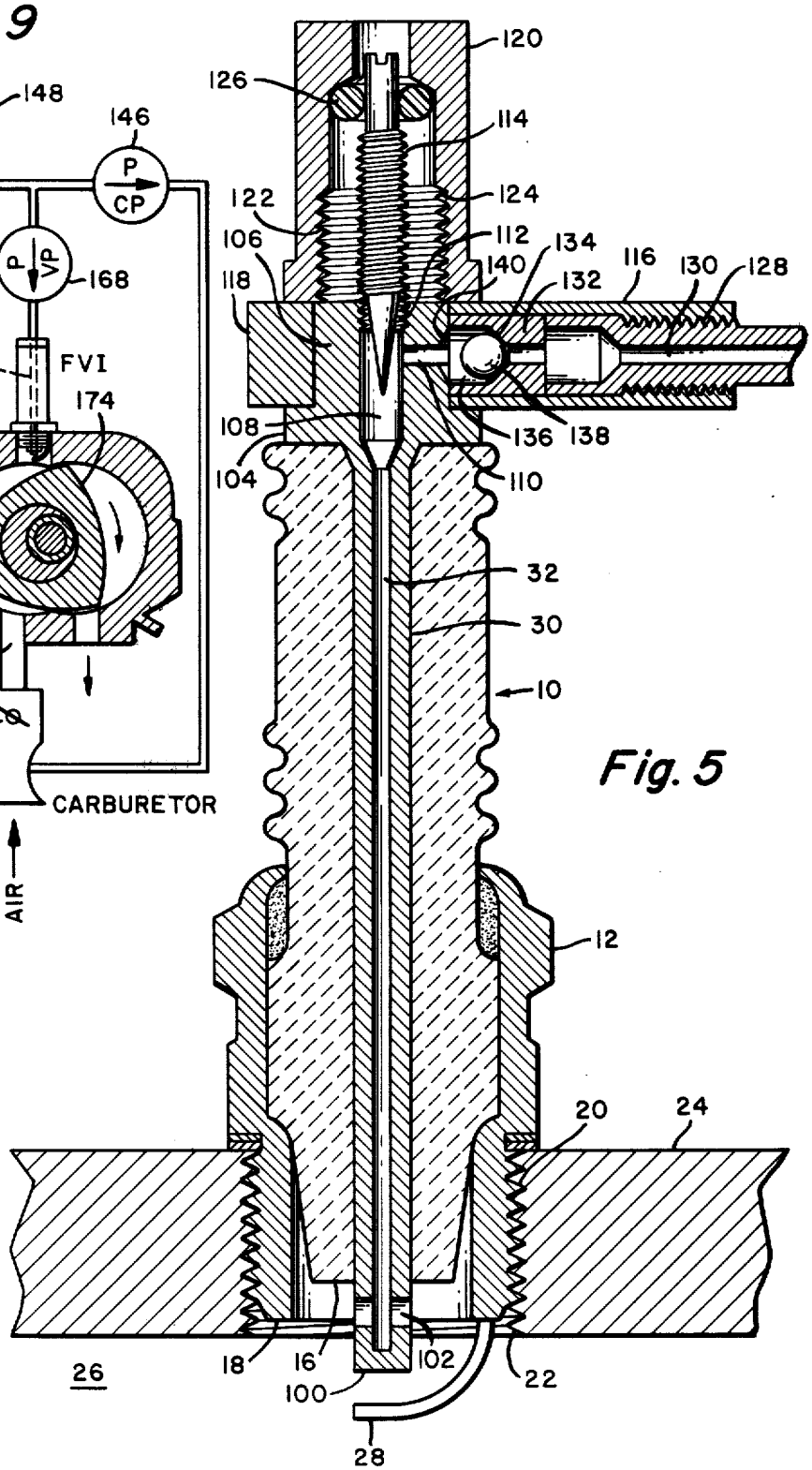
Fig. 5

FUEL VAPOR INJECTOR AND IGNITER SYSTEM FOR INTERNAL COMBUSTION ENGINES

Matter enclosed in heavy brackets [ ] appears in the original patent but forms no part of this reissue specification; matter printed in italics indicates the additions made by reissue.

This invention relates to a combined fuel vapor injector-igniter means and method for operating internal combustion engines of the two- and four-cycle and rotary type.

Most automotive vehicles are powered by the carbureted spark ignition system known as the Otto cycle engine. In such a system, the air and fuel are mixed in the carburetor which passes through the intake manifold into the engine cylinder intake ports which are opened during the suction stroke. During the following compression stroke, the fuel-air mixture is compressed and ignited to produce the power stroke. The power output of the engine is controlled by a throttle valve in the carburetor.

The fuel economy and emissions characteristics of an internal combustion engine are highly dependent on air-fuel ratio. A balanced or stoichiometric ratio provides exactly enough oxygen so that all the fuel will be burned; a rich mixture will leave residual fuel after the oxidation reaction (burning) is completed, and a lean mixture will leave residual air after the reaction. In order to increase fuel economy and reduce harmful emissions, it is desirable to run engines at leaner than stoichiometric air-fuel ratios.

The ignition characteristics of hydrocarbon fuels, such as gasoline, are also highly dependent on fuel-air ratio. To achieve ignition, there must be heat, oxygen, and fuel vapor. When a heterogeneous mixture of fuel droplets, fuel vapor, and air exists in the presence of an igniter, the portion of the fuel which is in droplet form cannot mix intimately with the air, resulting in a mixture of liquid fuel droplets, and a lean fuel-air vapor which is leaner than the overall fuel-air mixture that has entered the engine. The remaining fuel vaporizes after ignition.

If the overall mixture in an engine is made leaner, the portion of the mixture in vapor phase is often too lean to ignite reliably. For this reason, current engine designs do not use a fuel-air ratio which is leaner than stoichiometric.

The stratified charge concept employs a means of providing a rich mixture in the vicinity of the igniter and a leaner mixture in the remaining portion of the charge. This makes possible the use of an overall mixture which is leaner than stoichiometric, yet is readily ignitable.

In this respect, the instant invention provides for stratified charge operation of internal combustion engines.

There is much prior art disclosing internal combustion engines employing the stratified charge concept and which acknowledge that this concept provides a number of theoretical advantages such as, for example, substantially complete combustion with consequent reduction of pollutants in the exhaust and increase in thermodynamic efficiency.

The principle of stratified charge has been embodied in a number of different applications. Thus, U.S. patents such as Weyl U.S. Pat. No. 3,718,425; Bloomfield U.S. Pat. No. 3,665,902; Warren U.S. Pat. No. 3,173,409; Stumfig U.S. Pat. No. 3,661,125; Beeh U.S. Pat. No. 2,391,220; Stroud U.S. Pat. No. 1,310,970; Stephan U.S. Pat. No. 2,008,803 and Shook II U.S. Pat. No. 2,795,214 disclose combined fuel injectors and igniters in devices designed to replace conventional spark plugs. Bishop et al. U.S. Pat. Nos. 3,696,798 and 3,315,650; Barber U.S. Pat. Nos. 2,469,448, 2,484,009 and 2,595,914 and Fenney U.S. Pat. No. 2,534,346 disclose separate igniters and fuel injectors wherein the fuel is directed as a swirling charge toward the igniter electrodes. Clawson U.S. Pat. No. 3,508,530; Warren U.S. Pat. No. 3,154,058 May U.S. Pat. No. 3,124,113; Evans U.S. Pat. No. 3,406,667; Von Seggern U.S. Pat. No. 3,359,958 and the aforementioned Stumfig patent disclose the use of auxiliary or pre-combustion chambers for initially burning part of the fuel with a fuel-injected, spark ignited cycle.

Another difficulty which is encountered in the operation of engines with multiple combustion chambers is the unequal distribution of fuel and air among combustion chambers. Extensive work has been done to overcome this difficulty, such as complex fuel injection systems, multiple carburetors, and exotic designs.

The instant invention provides a means for individually adjusting the flow of fuel to each combustion chamber, allowing for equilization of power output among combustion chambers, thereby eliminating this difficulty in an economical manner.

The primary object of the invention is to reduce fuel consumption and reduce harmful exhaust emissions of internal combustion engines. This is done by operating the engine at fuel-air ratios which are leaner than stoichiometric.

Another object of the invention is to provide reliable ignition which is ordinarily a problem when engines are operated at leaner than stoichiometric air-fuel ratios.

Mixtures of fuel and air leaner than stoichiometric, while they burn completely and thus do not tend to form hydrocarbon and carbon monoxide pollutants in the exhaust, are nevertheless difficult to ignite and quench easily. Additionally, the combustion takes place at temperatures high enough to cause the formation of oxides of nitrogen which exit in the exhaust as pollutants. Another important object of the invention is to provide a combined fuel vapor injector and igniter for replacement of the conventional spark plug and a method of operating the engine therewith which employs a fuel-air mixture leaner than stoichiometric while reducing quenching and producing temperatures lower than those required to produce the oxides of nitrogen.

Another object of the invention is to provide a combined fuel vapor injector and igniter to replace the conventional spark plug and a method of operating an internal combustion engine equipped therewith which is versatile in several ways. Firstly, power output may be controlled by varying fuel pressure to the injector without throttling air. Secondly, all or a portion of the fuel required by the engine for any given condition of load or speed can be fed by changing the fuel pressure and the geometry of the instant injector-igniter, thus eliminating the need for both idle and main metering systems now employed with conventional carburetors. Thirdly, the instant injector-igniter can be used with a conventional carburetor but allows the engine to run with leaner fuel-air mixtures than those now used with such a conventional carburetor.

Another object of the invention is to provide a fuel vapor injector-igniter and system of using same in an internal combustion engine in which the fuel in the injector is self-metering, thereby eliminating the need for expensive and often troublesome metering pumps, volumetric chamber metering devices and the like which are used in most fuel injection systems today.

Another object of the invention is to provide a combined fuel vapor injector and igniter and system of operating an internal combustion engine therewith which assures reliability of ignition and which can compensate for imbalance in fuel-air ratios in the different cylinders caused by manifold design by varying the amount of fuel injected into each cylinder.

Yet other objects of the invention are to provide a combined fuel vapor injector and igniter and system of operating an internal combustion engine therewith which can use or add different types of fuel or additives such as gasoline, alcohol, kerosene, propane, butane, hydrogen, water, methane, exhaust gas, etc., which permits use of low octane fuels, which allows increase in the compression ratio without increasing the possibility of pre-ignition or detonation and which minimizes formation of carbon in the injector-igniter.

Another object of the invention is to improve engine efficiency and performance by the introduction of fuel vapor into the heterogeneous mixture of liquid fuel droplets, fuel vapor, and air, thereby increasing the fraction of fuel in the vapor phase, which will improve the uniformity of the combustion wave in the combustion chamber and promote more complete combustion.

Another object of the invention is to provide for the introduction of a hot metallic catalyst in the form of the heat exchanger inside the injector-igniter, for the purpose of improving the anti-knock properties of the fuel.

Another object of the invention is to provide a system for operating internal combustion engines using gaseous fuels.

Another object of the invention is to achieve all of the above objectives using a simple, low cost device which can be easily manufactured and installed on new or existing design engines.

These and other objects and features of the invention will become more apparent as the following description proceeds in conjunction with the accompanying drawings wherein:

FIG. 5 is a view smilar to FIG. 1 of yet another form of fuel vapor injector-igniter;

FIG. 9 is a diagrammatic view of a rotary engine employing the instant invention.

Figure 1:
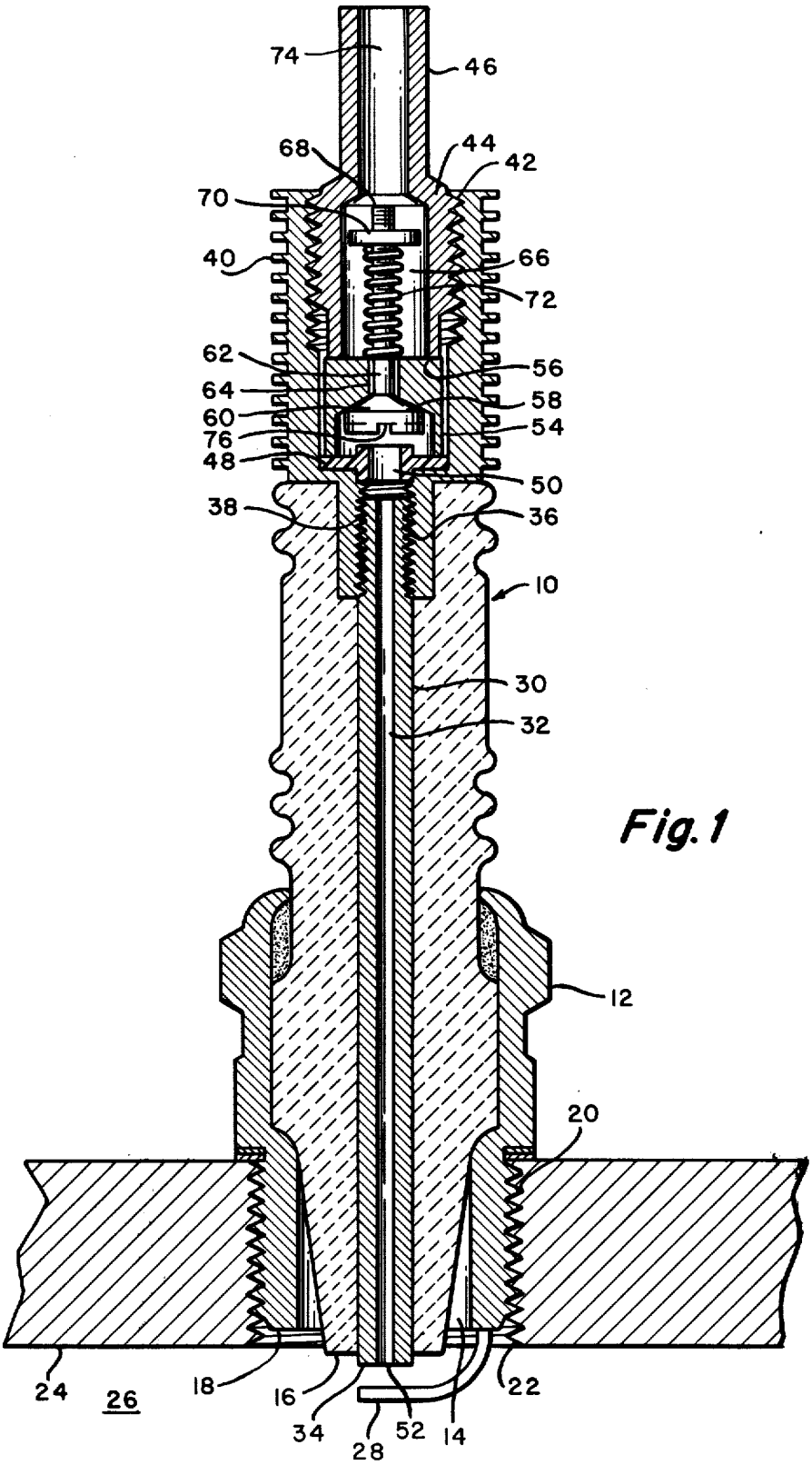
FIG. 1 is a longitudinal sectional view through one form of combined fuel vapor injector and igniter of the instant invention.

Referring first to the form of fuel vapor injector-igniter of FIG. 1, the device is intended to replace standard spark plugs and hence includes an elongated insulating body 10 of generally circular cross-section and a metal adapter 12 secured to and embracing the lower portion of the insulator, the adapter being hollow as at 14 so that the insulator 10 extends therethrough with the lower free end 16 extending below the lower edge 18 of the adapter. The lower portion of adapter 12 is externally threaded as at 20 so that it can be screwed into the internally threaded opening 22 provided in the wall or head 24 of a cylinder of an internal combustion engine to normally receive and mount a standard spark plug. Integral with or operatively connected to the lower edge of the adapter and extending into the combustion chamber 26 of the cylinder is a spark electrode 28 which curves towards and terminates below the center of the insulator 10.

Extending longitudinally or axially through the insulator 10 is a metal fuel vaporizing tube 30 having an inner bore 32. The lower end 34 of the tube extends into the combustion chamber 26 below the lower end 16 of the insulator and is located above and adjacent the electrode 28. The tube 30 is operatively connected to the electrical supply and serves as the other electrode of the igniter, the spark gap being the space in the combustion chamber between electrode 28 and the lower end 34 of the metal tube 30.

The upper end of the tube 30 is externally threaded as at 36 to receive the internally threaded nipple 38 of a metallic member having circumferential, longitudinally spaced cooling fins 40. The member 40 is hollow and at its upper end is provided with an internally threaded portion 42 to receive the externally threaded nipple 44 of a hollow adapter 46 which is adapted for operative connection to a fuel pump.

Resting on the upper edge 46 of the metallic fuel vaporizing tube 30 is a disc or washer 48 with a through hole or fuel inlet orifice 50 of predetermined diameter, the diameter of which orifice can be varied by substituting discs with predetermined orifice diameters. The fuel vapor outlet orifice 52 of the fuel vaporizing tube 30 is at the opposite end of the tube and its size can also be varied by altering the diameter of the tube bore 32 or by other means shown in FIGS. 2 and 4.

Figure 4:
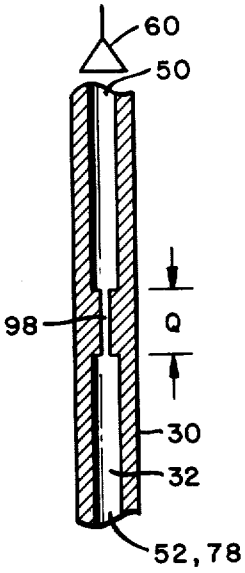
FIG. 4 is a diagrammatic view of a variation of the fuel vaporizing injection tube per se.

As will be explained in more detail later, to provide a stratified charge comprising only vaporized fuel and air in a relatively homogeneous mixture at the spark gap just before firing, the flow of fuel into the vaporizing tube must occur at the suction or intake stroke of a four-cycle engine or the compression phase of a two-cycle and rotary engine, in which case a check valve is incorporated in the device which opens when the pressure from the fuel pump exceeds that in the cylinder. Any kind of check valve can be employed, such as a spring-urged valve, as indicated in FIG. 1, or a free-floating or ball valve as shown in FIG. 4 or a poppet valve to provide one-way flow from the fuel source to the vaporizing tube.

Figure 2:
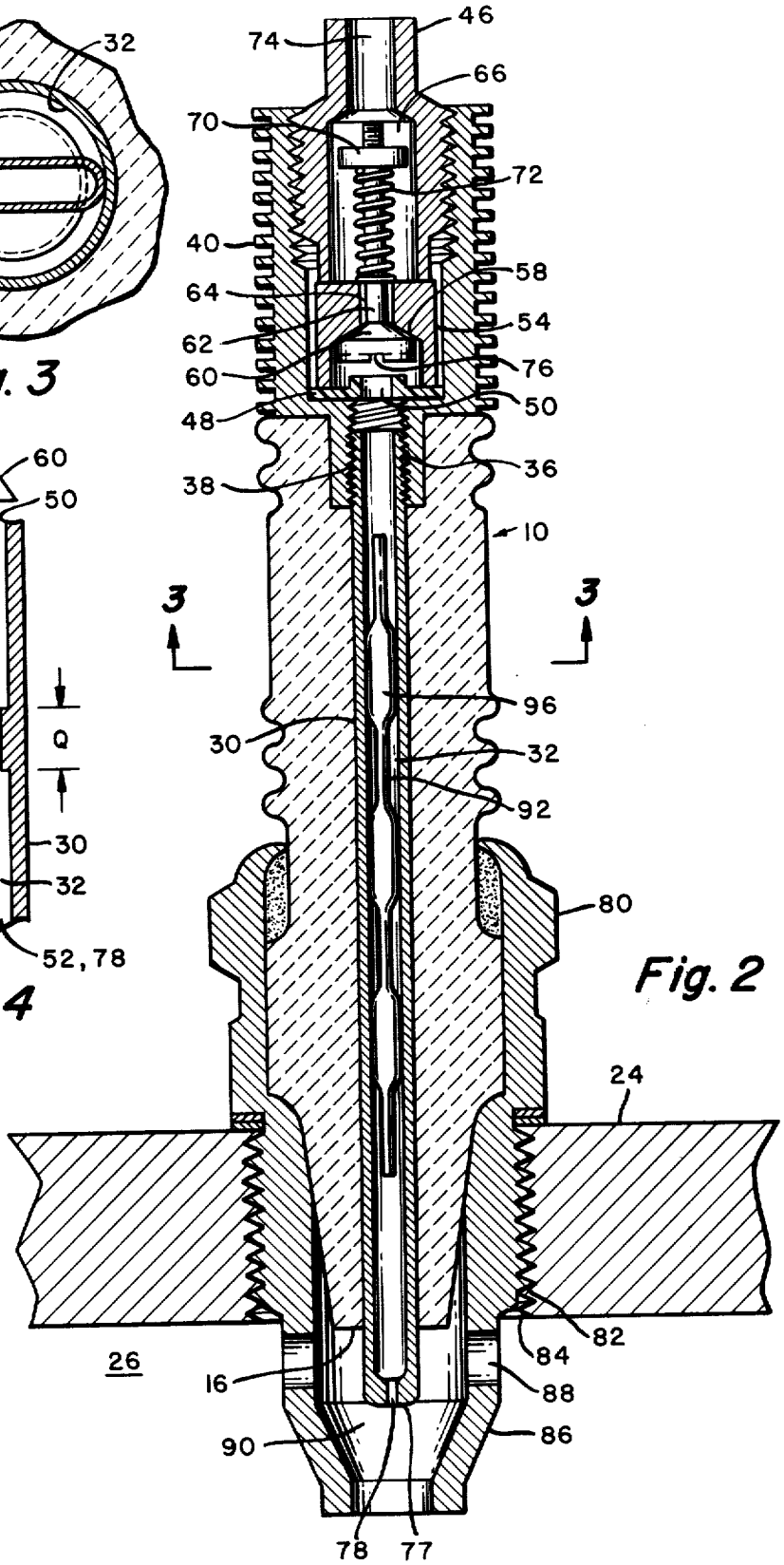
FIG. 2 is a view similar to FIG. 1 of another form of fuel vapor injector-igniter.

In the case of the spring-urged valve shown in FIG. 2, the same comprises a valve body 54 which is held in place against the orifice disc 50 when the adapter 46 is screwed home since its lower edge abuts the upper wall 56 of the valve body at that time. The valve body 54 includes an internal tapered valve seat 58. A tapered valve 60 is provided which is secured to the end of a valve stem 62 which extends through a bore 64 that opens through the upper wall 56 of the valve body. The stem extends into a cavity 66 in the adapter 44 and is threaded at its free end as at 68 to receive a nut 70. Wound about the stem and pressing against the nut 70 and the wall 56 of the valve body is a spring 72 which normally urges the valve 54 towards the seat 58 to close it off when the pressure in the cylinder exceeds the fuel pressure.

On the intake or suction stroke of the piston of a four-cycle engine or the compression phase of a two-cycle and rotary engine, the check valve will open and fuel will flow through the bore 74 of the adapter 46 into the cavity 66 through the bore or passage 64 of the valve body around the valve 60 through the orifice 50 and into the metallic tube 30 where it will vaporize and exit from the orifice 52 into the combustion chamber 26 where it will mix with air and be fired at the top of the compression stroke and in a manner to be described hereinafter. To ensure that the valve 60 will not close off the orifice 50 when it is fully open, cross channels 76 are cut into the lower surface of the valve. Before proceeding to describe the system employing the fuel vapor injector-igniter in detail later, it should be noted that to vary the heat retained in the tube 30 its length and thickness can be varied as can the inlet and exit orifices 50 and 52 thereof, and the cooling fins at the check valve are used to assure that the fuel is relatively cool in that zone.

Figure 3:
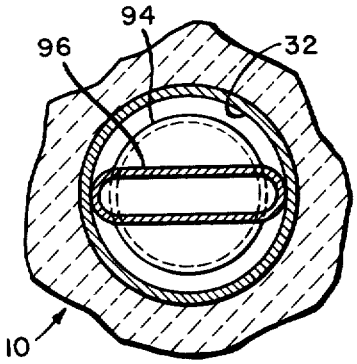
FIG. 3 is a sectional view taken on the line 3—3 of FIG. 2.

Referring now to FIGS. 2 and 3 it will be noted that the fuel vapor injector-igniter shown therein is substantially of the same construction as that shown in FIG. 1 except for the following. The wall of the longitudinal metallic fuel vaporizing tube is thinner and terminates at its lower end 77 below the lower end 16 of the insulator 10 in the combustion chamber 26 of the cylinder. The end 77 is restricted to provide a fuel vapor exit orifice 78 which is narrower than the diameter of the fuel vaporizing tube bore 32. Thus, by altering the lower end 77 of the fuel vaporizing tube, different size fuel vapor exit orifices can be provided to allow for development of back pressure serving as a flow control.

Additionally, the metallic adapter 80 to secure the fuel vapor injector-igniter in the cylinder wall is different. Like the adapter 12 it contains an externally threaded lower portion 82 which is received in a corresponding internally threaded through hole 84 in the upper wall 24 of the cylinder which normally receives and retains the conventional spark plug which the instant fuel vapor injector-igniter replaces.

The lower end of the adapter 80 which extends into the combustion chamber 26 is provided with a tapered shield or shroud 86 having circumferentially spaced ports or apertures 88 therein just above the exit orifice 78 to produce a venturi effect when the fuel vapor or gas exits from orifice 78 and mixes with air passing through the apertures 88. Since the venturi shield 86 is one igniter electrode and the tube 30 is the other electrode, the area 90 in the venturi shield is the spark gap where the rich fuel vapor-air mixture is ignited.

This shield or shroud 86 can be formed in various configurations and can even exclude the ports 88 in which case the portless shield will serve to control the operating heat range of the injector tube 30 depending upon the design of the combustion chamber. Thus, for example, depending upon the design of the combustion chamber, the shield can deflect the incoming cool gases away from the injector tube 30 and absorb heat of combustion to prevent too rapid cool down of the injector tube and thereby aid fuel vaporization. The shield also acts to confine the exiting fuel vapors from the injector tube in the spark gap.

Depending upon the load and operating conditions of the engine, there are times when a higher fuel vapor flow output is required, in which case the fuel vaporizing tube must transfer a greater amount of heat and this can be accomplished by any means which will increase the surface area in the tube to which the combustion is exposed. One such means is shown in FIGS. 2 and 3 and comprises a tubular member 92 retained within the fuel vaporizing tube 30 for any given length thereof. The inner tubular member 92 is a cylindrical member 94 of diameter somewhat less than the diameter of the bore 32 of the fuel vapor injector tube, which member 94 is flattened at vertically spaced areas along the length thereof to produce portions 96 whose longer dimension approaches the diameter of the bore 32 and frictionally engages the wall thereof while exposing the fuel to a greater surface area in the fuel vaporizing tube 30.

Inasmuch as the fuel in the tube 30 is vaporized because of the heat retained in the tube due to the fact that the products of combustion in the chamber 26 and in the tube 30 are in direct contact with the fuel vaporizing tube 30, the rate at which the fuel vaporizes in the tube may require variable adjustment depending upon the load and operating conditions of the engine. Aside from varying the size of the inlet orifice 50 and exit orifice 52 or 78 to accomplish this, varying the location of the quenching zone along the length of fuel vaporizing tube 30 can also serve as a means to establish a rate of fuel vaporization. As shown in FIG. 4, the tube diameter of the bore 32 can be restricted anywhere along its length 30 to provide a narrower bore 98 whose length constitutes a quenching zone Q between the fuel inlet orifice 50 and fuel vapor exit orifice 52 or 78. Varying the location of the quenching zone along the tube 30 will control the fuel vaporization rate in the tube. In the forms of the fuel vapor injector-igniter shown in FIGS. 1–3 and 5, the fuel burning in the tube 30 is quenched at the top where the check valve is located.

Referring now to FIG. 5, it differs from the previously described combined fuel vapor injector and igniter as follows. Like that shown in FIG. 1 the lower end of the metallic vaporizing tube 30 which extends into the combustion chamber is unshrouded. However the lower end 100 of the tube 30 immediately above the other spark electrode 28 is closed, but above it and below the lower end 16 of the insulator, the wall of the tube 30 is provided with circumferentially spaced ports or orifices 102 from which the fuel vapor exits in such a way as to induce a flow of gases from the cylinder around the electrodes 100 and 28 where the spark takes place.

Additionally, in FIG. 5 the tube 30 extends through the top of the insulator 10 and has affixed thereto an adapter comprising a hex nut portion 104 which bears on the top edge of the insulator, a member 106 upstanding therefrom which surrounds the upper portion 108 of the tube 30 and which includes a lateral passage 110 therein which communicates with the upper portion 108 of the tube to serve as a fuel inlet orifice.

The upper end of the member 106 includes an internally threaded bore 112 in axial alignment with the tube 30 above its upper portion 108 into which is threaded a needle valve 114 to vary the size of the fuel inlet orifice 110 and, hence, the rate of flow of the fuel. A lateral member 116 is provided which has a collar 118 that slips over the member 106 and is held in place by a cap 120 with internal threads 122 which engage the externally threaded portion 124 of the member 106. To prevent leakage around the needle valve, an O ring 126 is held in the cap 120 around the upper end of the needle valve.

The lateral member 116 is tubular and is internally threaded at its end to receive a threaded member 128 to couple it to the fuel line. The bore 130 of the member 116 includes a body 132 having a tapered valve seat 134 and a recess 136 thereinfront which communicates with the inlet orifice passage 110 and contains a free floating ball 138 serving as a check valve. The recess 136 includes an undercut portion 140 opposite the valve seat 134 to prevent the passage 110 from being closed off when the check valve opens as the pressure drops in the cylinder in the intake stroke.

The method of operating the two- and four-cycle engines and the rotary engine using the instant combined fuel vapor injector and igniter will now be described, it being understood that, while spark ignition is shown in the drawings, the fuel vapor injector can be combined with other ignition systems such as glow plugs, static and high frequency ignition, etc.

Figure 6:
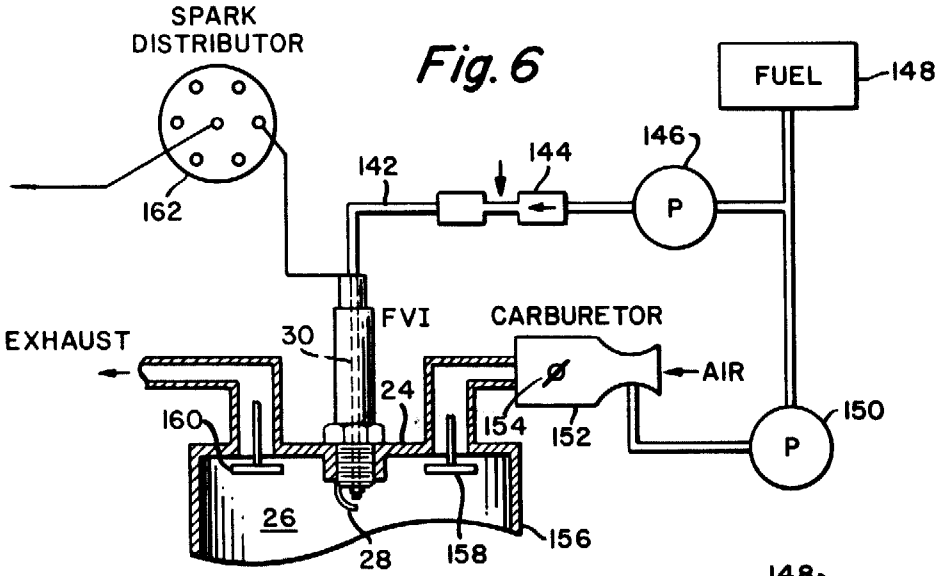
FIG. 6 is a diagrammatic view of a four-cycle engine employing the instant invention.

Considering first the four-cycle engine shown diagrammatically in FIG. 6 wherein the fuel vapor injector-igniter is designated FVI, the latter is connected via conduit 142 and remote control variable orifice 144 to a constant or variable pressure pump 146, which develops a small positive pressure of about 3–7 psi and which pumps liquid fuel from a fuel source or tank 148 to the injector tube 30 without metering or sequentially distributing the fuel. The fuel is also pumped by a constant or variable pressure pump 150 into a carburetor 152 equipped with a throttle or butterfly valve 154 there to be admixed with air for delivery to the cylinder 156 through an intake valve 158, the cylinder also being equipped with an exhaust valve 160. A distributor 162 is electrically connected to the fuel vaporizing tube 30 while the other electrode 28 is connected to ground.

During the intake or suction stroke, the pressure in the cylinder drops below 1 atm. and the check valve 60 or 138 opens and liquid fuel flows into the injector tube 30. At the same time, the intake valve 158 opens to admit an air-fuel mixture into the cylinder which is leaner than stoichiometric. The fuel in the injector tube is heated under reduced pressure and eventually vaporizes and expands but there is a time lag in causing the phase change from liquid to gas or vapor due in part to the latent heat of vaporization and the temperature gradient in the tube 30 which is cooler at the inlet orifice than at the exit orifice.

When the pressure in the cylinder rises above atmospheric or to the point where there is no differential pressure between it and the fuel pressure at the check valve (generally towards the end of the intake stroke or shortly after the start of the compression stroke), the check valve will close off the fuel feed to the injector tube.

Because of the aforementioned time lag, it is after the start of the intake stroke when the fuel exits from the exit orifice 52, 78 or 102 into the cylinder as a gas or vapor and mixes with lean air-fuel mixture or air therein. When the piston is at about 40° to 10° before top dead center, the igniter fires and ignites the fuel in the spark gap area of the combustion chamber which contains a rich homogeneous fuel vapor-air mixture in that area creating a flame and causing it to propagate in the cylinder to produce the power stroke.

At that time the pressure in the cylinder rises and forces a portion of the fuel-air mixture up into the injector tube 30 heating the latter, the flame actually entering the tube until it is quenched.

During the exhaust stroke the completely combusted gases are forced out of the exhaust port from both the cylinder 156 and the injector tube 30, the latter retaining a good deal of the heat acquired during the power stroke.

Figure 7:
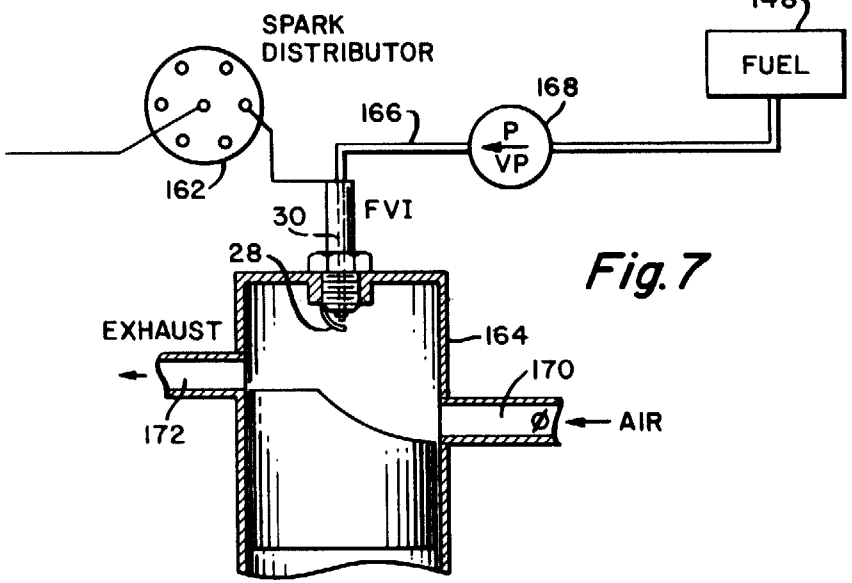
FIG. 7 is a diagrammatic view of a two-cycle engine employing the instant invention.

With reference to the two-cycle engine shown in FIG. 7, as the exhaust port 172 opens and the pressure in the cylinder 164 decreases, the check valve 60 or 138 opens and liquid fuel flows into the injector tube 30 from a conduit 166 which is connected via a variable pressure pump 168 to a fuel source or tank 148. The fuel pressure required to operate a two-cycle engine with the instant injector will be higher than that required for a four-cycle engine. Hence, at any given speed, the engine must intake, vaporize and inject at about twice the rate of the four-cycle engine and, thus, it is preferred that the vaporizing tube 30 have a high internal surface as with the injector of FIG. 2 or by filling the tube with porous high temperature metals or ceramics or any other suitable means.

During the piston drop, the air and exhaust ports 170 and 172 opened. As the piston moves up and closes off these ports (compression stroke), fuel exits as a vapor from the exit orifice of the injector tube 30 into the combustion chamber of the cylinder and forms a homogeneous fuel vapor-air admixture in the area of the spark which is ignited and forms a flame that propagates throughout the cylinder producing the power stroke. The remaining thermodynamic and physical behavior of the fuel vapor injector-igniter in the two-cycle engine is substantially the same as described hereinbefore with reference to the four-cycle engine.

The application of the instant invention to a two-cycle engine overcomes many known disadvantages thereof. Although the two-cycle engine is lighter in weight, has fewer parts, is lower in cost and has a high power to weight ratio, it has poor specific fuel consumption and incomplete combustion forming free hydrocarbons in the exhaust. The instant invention provides low specific fuel consumption and complete combustion, hence reduced pollutants in the exhaust.

In the rotary engine shown diagrammatically in FIG. 9, here again we are dealing with an engine whose rate of rotation generally is higher than that of a four-cycle engine, usually about 20% higher in rpm than the four-cycle engine. The rotor 174 is mounted for eccentric rotation in a stator 176 in such a manner that the apexes of the rotor are always in contact with the internal surface of the stator. The fuel-air mixture enters the stator from the carburetor 152 through a port 178 which is substantially diametrically opposite the fuel vapor injector-igniter. Since at this intake phase the pressure at the injector is about 1–3 atmospheres, the variable pressure fuel pump operates at a higher pressure to force the check valve to open. Thereafter the rotor goes through a compression phase at which the fuel in vapor form exits from the orifice of the tube 30 into the combustion chamber where it forms a homogeneous vapor mixture with the air at the igniter which then fires to provide the power phase and exhaust gases exit from a suitable port 180. In view of the speed of rotation of the rotary engine the fuel must be rapidly vaporized in the tube 30 in which case the tube is provided with a suitable means to increase its surface contact with the fuel passing therethrough, such as the structure shown in FIG. 2 or the use of high temperature porous metals or ceramics in the tube and the like.

Figure 8:
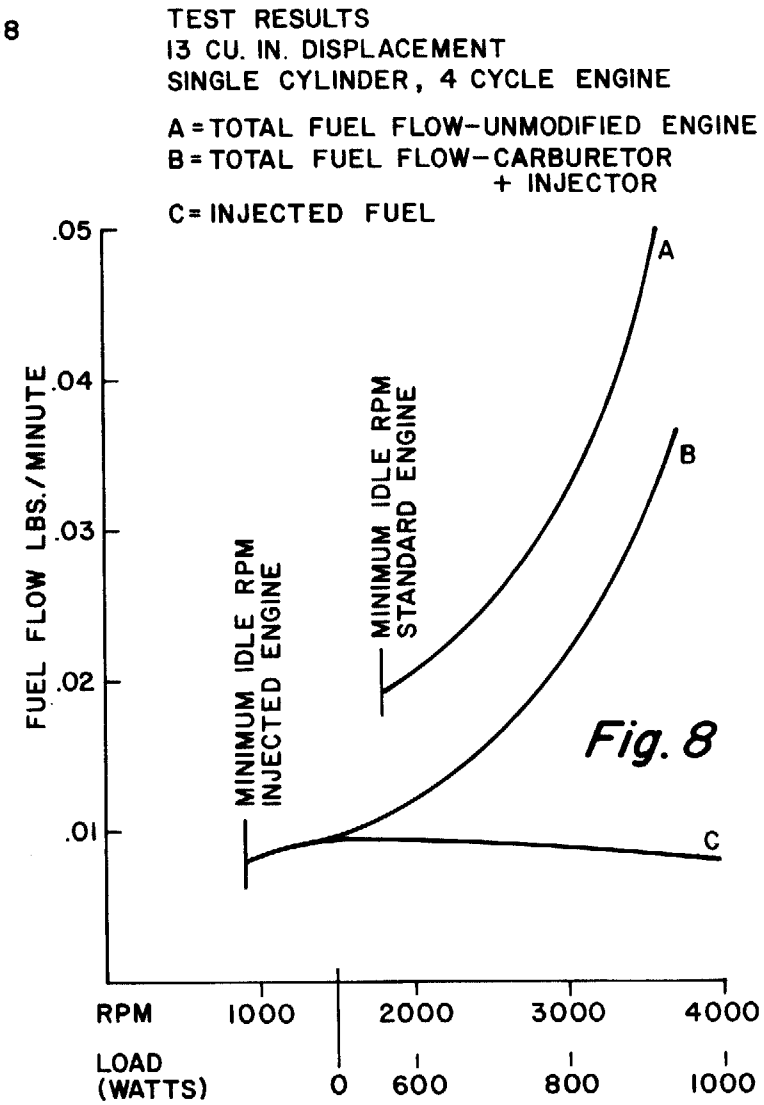
FIG. 8 is a graph of performance of a test four-cycle engine with and without the instant invention.

Referring to the graph of FIG. 8 which compares fuel flow with load and output of a test engine using an unmodified conventional spark plug and operation and the same engine equipped with the instant combined fuel vapor injector and igniter, the test engine was a 13 cu. in displacement, single cylinder, four-cycle engine. Air-fuel mixtures from 10.5:1 to 22:1 were used with conventional spark plugs, the best specific fuel consumption ratio for the test engine being about 16:1.

The test engine equipped with the various combined fuel vapor injector and igniter units of the instant invention, in place of the conventional spark plugs, was run at air to fuel ratios of 10:1 to as lean as 45:1.

At 1,000 rpm, the test engine was run with partially closed to fully open throttle and air to fuel ratios from about 15:1 to 45:1. At higher speeds, the average ratio used was about 18:1, which appeared to be the best specific fuel consumption ratio. About 15-30 percent improvement over conventional spark ignition was obtained with the combined fuel vapor injector-igniter at the same rpm and load. For example, at a 30 percent load (800 watts), the average improvement was 29 percent. The result is attributed to the rapid dispersion of heated fuel vapors throughout the combustion chamber 26 prior to ignition and positive ignition at each cycle thereby eliminating cyclic pressure dispersion which is usually encountered when an engine is operated on lean air-fuel mixtures.

The spark was advanced for best operation of the test engine to about 6°-12° BTC using the conventional spark plug and 18°-32° BTC when using the instant combined fuel vapor injector and igniter because slower burning lean air fuel mixtures require advanced timing to achieve maximum BMEP, i.e. Brake Mean Effective Pressure.

The fuel used was 90-93 octane leaded automobile gasoline. At 30 percent load 3,000 rpm, and 800 watt output, using conventional spark plugs, the test engine running at 16:1 air:fuel ratio detonated at 6° BTC spark advance, with 14-15:1 air:fuel ratio it detonated at 10°-12° BTC. Using the combined fuel vapor injector and igniter of the instant invention there was no apparent detonation at air:fuel ratios of 20:1 or leaner to 32° BTC spark advance, and in all cases the engine equipped with the instant combined fuel vapor injector and igniter was more difficult to detonate than with the engine equipped with standard spark plugs.

Using standard spark plugs, the average concentration of unburned hydrocarbon pollutants in the exhaust was about 400 ppm with air-fuel ratios of 13:1 and about 65 ppm at air:fuel ratios of 20:1; and the carbon monoxide concentration in the exhaust gases was about 0.2 percent with an air-fuel ratio of 20:1.

Using the instant combined fuel vapor injector and igniter, it was found that the concentration in the exhaust of unburned hydrocarbons was about 100 ppm with an air:fuel ratio of 20:1, 70 ppm with an air:fuel ratio of 25:1, and a concentration of carbon monoxide of about 0.1 to 0.3 percent at all ratios of air:fuel leaner than stoichiometric (15:1).

Regarding the concentration of oxides of nitrogen, $NO_x$, in the exhaust, the same was not measured directly but the exhaust from the engine using the instant combined fuel vapor injector and igniter is expected to produce fewer $NO_x$ emissions because the same provides a leaner charge operation whose exhaust gas temperature (EGT) will be 100°-200° F. lower than the EGT for a stoichiometric air-fuel mixture. This temperature drop should prevent or minimize formation of $NO_x$.

The fuel pressure used in the four-cycle test engine was 5-10 psi. For a two-cycle or rotary engine, the fuel pressure required would be about 150-200 psi and, hence, the check valve in the instant fuel vapor injector igniter would be set to open when the cylinder pressure dropped below 150-200 psi.

The fuel vaporizing tube 30 used in the test engine was made of high nickel stainless steel with an O.D. of 0.094 inch, and I.D. of 0.072 inch and a length of 2 inches. Tubes with an insert 92 (FIG. 2) to increase the internal surface thereof were used as well as tubes with fixed inlet and outlet orifices of different sizes and a variable inlet orifice as shown in FIG. 5, as well as tubes of different thicknesses, to alter the mass and thus the retention of heat therein depending upon the desired flow of fluid fuel into the tube and the rate of flow of vaporized fuel from the exit orifice relative to the speed of the engine and the load thereon. For example, a 30 cu. in. cylinder of a four-cycle engine, as compared to the 13 cu. in. test engine, requires a tube having about a 0.120 inch O.D$\times$0.092 I.D.$\times$2½ inch length with an exit orifice reduced to 0.062 inch plus an internal heat exchange tube 92 as shown in FIG. 2.

In the test engine, it was found that the fuel required to idle it as approximately $4\times10^{-6}$ lbs. of fuel per power stroke. This is a small quantity which takes about 7 milliseconds to vaporize in an injector tube that has an O.D. of 0.097 inch, an I.D. of 0.074 inch and a length of 2 inches and a temperature gradient along the tube from about 250° F. at the entrance or inlet orifice to about 1200° F. at the exit orifice. It is the heat of combustion in the cylinder and in the injector tube which heats the injector tube to vaporize the fuel.

In sum, what the graph of FIG. 8 shows are the test results obtained by applicant using the test engine with a standard or conventional spark plug and with the substitute combined fuel vapor injector-igniter. Curve A represents the amount of fuel used at various loads on the engine and engine rpms for the engine using the standard spark plugs. Curve B represents the total amount of fuel used, that is, the fuel from the carburetor and from the injector, in the engine which was run with the instant fuel vapor injector-igniter, at various loads on the engine and engine rpms. Curve C represents the amount of fuel used by the engine from the injector-igniter alone at various loads on the engine and at various rpms.

One concludes from FIG. 8 that at idle (up to 1500 rpm) all of the fuel used by the engine is going through the injector. At about 3,000 rpm and 800 watts output, about one-third of the fuel goes through the injector and about two-thirds through the carburetor. The engine without the combined fuel vapor injector-igniter but with the standard spark plug could not be idled below about 1800 rpm. With the combined fuel vapor injector-igniter, reliable idle of the engine is obtained at about 900-1000 rpm indicating improved combustion at low speeds; and at these low speeds the air:fuel ratio is quite lean, i.e. as lean as 45:1.

In the operation of a conventional internal combustion engine both the air and the fuel must be heated to vaporize the fuel since the fuel will not burn in the liquid state. Attempts to preheat the air-fuel mixture coming out of the carburetor to vaporize the fuel droplets expands the air thereby reducing the volumetric efficiency of the engine.

In the operation of an internal combustion engine with the instant combined injector-igniter, the fuel is vaporized in the injector tube prior to entry in the combustion chamber of the cylinder while the air entering through the intake manifold is cool. A most desirable homogeneous mixture of fuel and air is produced in the chamber without diminishing the volumetric efficiency. Prior attempts to employ a stratified charge in the engine have resulted, by and large, in creating a heterogeneous mixture of liquid fuel and air which may not burn completely in the short time available for combustion.

In the instant invention, the fuel that enters the cylinder prior to ignition diffuses rapidly throughout the combustion chamber. The fuel from the injector tube enters the chamber as a vapor and mixes with the air at the spark gap at the time of ignition. The rich portion of the stratifeid mixture is minute and only in the area of the spark gap. Ignition occurs towards the end of the compression stroke, thus causing a flame to occur thereat which propagates rapidly throughout the chamber to produce the power stroke. The result is better engine efficiency, the ability to use very lean air-fuel mixtures, complete combustion and hence low pollutant emission, low mean and maximum combustion temperatures to militate against formation of oxides of nitrogen, and reliability of ignition.

Moreover, the various factors governing such favorable operation with injected fuel vapor in timed relation with and in the vicinity of the igniter in the combustion chamber can be readily varied by changing the mass of the injector tube 30, the sizes of the fuel inlet orifice 50 or 110, altering the surface area of the injector tube 30, and the location of the flame quenching zone Q in relation to the design of the engine and the desired operating characteristics. These factors act to balance the quantity of fuel going into the injector with the amount of residual heat retained in the tube 30 required to vaporize the fuel so that it exits into the combustion chamber in a gaseous state at the time the spark occurs, that is, when the pressure in the chamber rises in the compression stroke.

As mentioned earlier, the instant invention is especially useful in equalizing power output of internal combustion engines with multiple cylinders. Thus, by providing each cylinder with the instant combined fuel vapor injector and igniter device and varying the flow of fuel to each injector tube, the quantity of fuel supplied to each cylinder is individually controlled so that any lack of uniformity of the mixture, ratio or quantity of the air-fuel mixture between the cylinders is equalized.

The invention is also applicable to fuels fed to the injector tube which are already gaseous, e.g. hydrogen, methane, propane, etc. In that case, the injector tube does not act to vaporize the fuel but rather to heat and expand the gaseous fuel fed thereto and the heated expanded gaseous fuels pass into the combustion chamber through the exit orifice to admix with the air therein to be ignited and burned as described hereinbefore. The test engine using the instant invention and propane exhibited very smooth and responsive operation through all speed ranges.

While preferred embodiments of the invention have here been shown and described, it will be understood that skilled artisans may make minor variations without departing from the spirit of the invention.

What is claimed is:

1. In combination with an internal combustion engine having a combustion chamber and means to selectively supply air or an air-fuel mixture thereto, a combined fuel vapor injector and igniter comprising an insulating body, an electrically conductive member securing said body to said chamber and including a first electrode extending into said chamber, a heat *and* electrically conductive vaporizing tube extending through said insulating body and into said chamber serving as a second electrode and terminating in an end adjacent said first electrode to provide a spark gap therebetween, a fuel vapor exit orifice at said end of said tube, a liquid fuel inlet orifice adjacent the other end of said tube, means to supply liquid fuel to said tube through said inlet orifice, a check valve interposed between said inlet orifice and said fuel supply means, said check valve opening only in response to a predetermined drop in pressure in said chamber to allow fuel to enter said inlet orifice, said vaporizing tube having been heated by the combustion in said chamber and in said tube, and means to provide a spark across said spark gap at and during the time fuel in vapor form exits into said chamber from said exit orifice to admix with the air or an air-fuel mixture in said chamber supplied thereto and produce a readily ignitable mixture of fuel vapor and air at said spark gap, said electrically conductive member including an open-ended shield surrounding said fuel vapor exit orifice of said tube to confine the exiting fuel vapor and increase the ratio of fuel to air in said shield.

2. The combination of claim 1 and means to vary the size of said fuel inlet orifice.

3. The combination of claim 2 wherein said means to vary said fuel inlet orifice is a needle valve secured to said insulating body and extending variably across said inlet orifice.

4. The combination of claim 2 wherein said means to vary said fuel inlet orifice are discs adapted selectively to seat on said other end of said vaporizing tube having openings of varying sizes communicative with said tube.

5. The combination of claim 1 wherein said first electrode is a venturi shield surrounding said fuel vapor exit orifice, said shield including circumferentially spaced ports to draw air therethrough and increase the admixture of fuel vapor and air into said shield which serves as the spark gap area.

6. The combination of claim 1 wherein said first electrode is a shield which acts to control the heat range in the injector tube and confine the exiting fuel vapor therein to increase the ratio of fuel vapor to air in said shield which serves as the spark gap area.

7. The combination of claim 1 and means to control the heat retentive capacity of said tube to vary the rate of fuel vaporization therein.

8. The combination of claim 7 wherein said means to control the heat retentive capacity of said tube includes a heat conductive insert in said tube increasing the internal surface thereof and providing a tortuous path for the flow of fuel therethrough from the inlet to the exit orifice.

9. The combination of claim 1 wherein the internal combustion engine is a four-cycle engine having a piston reciprocal in the chamber, intake and exhaust valves, the air or fuel-air mixture being supplied through said intake valve, said check valve opening in response to a drop in pressure in the chamber to allow fuel to enter said fuel evaporating tube through said inlet orifice during the intake stroke of said engine while the air or fuel-air mixture are drawn selectively into said chamber at said time, said check valve closing when the pressure in said cylinder rises to a value above that of the fuel supply to said inlet orifice, fuel vapor entering said spark gap area from said exit orifice to admix with air thereat and produce a readily ignitable mixture of fuel vapor and air at and during the time said spark is produced.

10. The combination of claim 1 wherein the internal combustion engine is a two-cycle engine having a piston reciprocal in the chamber and air intake and exhaust ports, said check valve opening in response to a drop in pressure in the chamber to allow fuel to enter said inlet orifice of said fuel vaporizing tube when the piston drops to uncover said air and exhaust ports, said check valve closing as said piston moves up and increases pressure in said chamber during the compression stroke, fuel vapor entering said spark gap area from said exit orifice to admix with air thereat and produce an ignitible mixture of fuel vapor and air at and during the time the spark is produced.

11. The combination of claim 1 wherein the internal combustion engine is a rotary engine having a stator forming the combustion chamber, a rotor of substantially triangular cross-section mounted for eccentric rotation therein, a fuel-air inlet port and an exhaust port, said combined fuel vapor injector and igniter being secured to said stator, said check valve opening during the compression phase of engine operation to allow fuel to enter said inlet orifice of said tube, said check valve closing before the end of the compression phase, fuel vapor entering the spark gap area from said exit orifice to admix with the air thereat and produce an ignitible mixture of fuel vapor and air at and during the time the spark is produced.

12. The combination of claim 1 and a flame quenching zone in said fuel vaporizing tube.

13. The combination of claim 12 and means to vary the location of the flame quenching zone along the length of said tube.

14. The combination of claim 13 wherein said means to vary the location of the flame quenching zone includes at least one restriction acting to narrow the bore of said tube selectively at at least one predetermined location along the length thereof.

15. In combination with an internal combustion engine having multiple combustion chambers and means to selectively supply air or an air-fuel mixture thereto, a combined fuel vapor injector and igniter for each combustion chamber comprising an insulating body, an electrically conductive member securing said body to said chamber and including a first electrode extending into said chamber, a heat and electrically conductive vaporizing tube extending through said insulating body and into said chamber serving as a second electrode and terminating in an end adjacent said first electrode to provide a spark gap therebetween, a fuel vapor exit orifice at said end of said tube, a liquid fuel inlet orifice adjacent the other end of said tube, means to supply liquid fuel to said tube through said inlet orifice, means to vary the supply of liquid fuel to said tube, a check valve interposed between said inlet orifice and said fuel supply means, said check valve opening only in response to a predetermined drop in pressure in said chamber to allow fuel to enter said inlet orifice, said vaporizing tube having been heated by the combustion in said chamber and in said tube and means to provide a spark across said spark gap at and during the time fuel in vapor form exits into said chamber from said exit orifice to admix with the air or an air-fuel mixture in said chamber supplied thereto and produce a readily ignitable mixture of fuel vapor and air at said spark gap, said means to vary the supply of liquid fuel to each tube acting to equalize the power output from each chamber, said electrically conductive member including an open-ended shield surrounding said fuel vapor exit orifice of said tube to confine the exiting fuel vapor and increase the ratio of fuel to air in said shield.

16. In combination with an internal combustion engine having multiple combustion chambers and means to selectively supply air or an air-fuel mixture thereto, a combined fuel vapor injector and igniter for each chamber comprising an insulating body an electrically conductive member securing said body to said chamber and including a first electrode extending into said chamber, a heat and electrically conductive tube extending through said insulating body and into said chamber serving as a second electrode and terminating in an end adjacent said first electrode to provide a spark gap therebetween, a fuel vapor exit orifice at said end of said tube, a fuel inlet orifice adjacent the other end of said tube, means to supply only fuel to said tube through said inlet orifice, means to vary the supply of fuel to said tube, a check valve interposed between said inlet orifice and said fuel supply means, said check valve opening only in response to a predetermined drop in pressure in said chamber to allow fuel to enter said inlet orifice, said tube having been heated by the combustion in said chamber and in said tube and expanding the fuel therein, and means to provide a spark across said spark gap at and during the time fuel in vapor form exits into said chamber from said exit orifice to admix with air or an air-fuel mixture supplied thereto and produce a readily ignitible mixture of fuel vapor and air at said spark gap, said means to vary the supply fuel to each tube acting to equalize the power output from each chamber, said electrically conductive member including an open-ended shield surrounding said fuel vapor exit orifice of said tube to confine the exiting fuel vapor and increase the ratio of fuel to air in said shield.

17. In combination with an internal combustion engine having a combustion chamber and means to selectively supply air or an air-fuel mixture thereto, a combined fuel vapor injector and igniter comprising an insulating body, an electrically conductive member securing said body to said chamber and including a first electrode extending into said chamber, a heat and electrically conductive tube extending through said insulating body and into said chamber serving as a second electrode and terminating in an end adjacent said first electrode to provide a spark gap therebetween, a fuel vapor exit orifice at said end of said tube, a fuel inlet orifice adjacent the other end of said tube, means to supply only fuel to said tube through said inlet orifice, a check valve interposed between said inlet orifice and said fuel supply means, said check valve opening only in response to a predetermined drop in pressure in said chamber to allow fuel to enter said inlet orifice, said tube having been heated by the combustion in said chamber and in said tube and expanding the fuel therein, and means to provide a spark across said spark gap at and during the time fuel in vapor form exits into said chamber from said exit orifice to admix with air or an air-fuel mixture in said chamber supplied thereto and produce a readily ignitible mixture of fuel vapor and air at said spark gap, said electrically conductive member including an open-ended shield surrounding said fuel vapor exit orifice of said tube to confine the exiting fuel vapor and increase the ratio of fuel to air in said shield.

18. A method of operating an internal combustion engine comprised of providing a tubular heat and electrically conductive member having one end opening into the combustion chamber and serving as an electrode and thereby exposing the same to the heat generated in said combustion chamber [providing a confining zone around said one end of said tubular member,] disposing another electrode in said chamber adjacent said one end of said tubular electrode to provide a spark gap therebetween, feeding liquid fuel to the tubular electrode adjacent its other end at a temperature less tnan that generated in the chamber, allowing the liquid fuel to flow into said tubular electrode only in response to a predetermined drop in pressure in said chamber feeding selectively an air or air-fuel mixture into said chamber when the liquid fuel is entering the tubular electrode and until the pressure in the chamber exceeds that of the liquid fuel feed into the tubular electrode to close it off, retaining the fuel in the tubular electrode for a time sufficient to allow the heat retained in the tubular electrode to cause the fuel therein to expand and exit as a vapor into the confining zone and producing a spark between the electrodes at and during the time the fuel vapor is exiting into the chamber to ignite the fuel vapor admixture with air in the chamber at that time to produce the power stroke.

19. The method of claim 18 and altering the internal volume of the tubular electrode to alter the heat retention thereof and hence the time required to allow the liquid fuel therein to change to a vapor state.

20. The method of claim 18 and altering the mass of the tubular electrode to alter the heat retention thereof and hence the time required to allow the liquid fuel therein to change to a vapor state.

21. The method of claim 18 and altering the heat conductive surface in the tubular electrode to control the time required to vaporize the fuel therein.

22. The method of claim 18 and varying the rate of flow of the fuel in the tubular electrode to control the quantity of fuel to exit as a vapor into the spark gap.

23. The method of claim 17 wherein a lean air-fuel mixture is fed into the combustion chamber which exceeds a ratio of 15:1 by weight of air to fuel excluding the fuel fed into the tubular electrode.

24. The method of claim 18 wherein the internal combustion engine is a four-cycle engine and wherein fuel is fed to the tubular electrode and the air or air-fuel mixture to the chamber during the intake stroke, the feed of fuel to the tubular electrode is stopped at the end of the intake stroke or beginning of the compression stroke and the fuel in the tubular electrode exits as a vapor into the chamber during the compression stroke.

25. The method of claim 24 wherein the pressure of the fuel feed to the tubular electrode is about 5–10 psi.

26. The method of claim 25 wherein the pressure of the fuel feed to the tubular electrode is about 150–200 psi.

27. A method of operating an internal combustion engine comprised of providing a tubular heat and electrically conductive member having one end opening into the combustion chamber and serving as an electrode and thereby exposing the same to the heat generated in said combustion chamber, disposing another electrode in said chamber adjacent said one end of said tubular electrode to provide a spark gap therebetween, feeding liquid fuel to the tubular electrode adjacent its other end at a temperature less than that generated in the chamber, allowing the liquid fuel to flow into said tubular electrode only when the pressure in the combustion chamber is below that of the pressure of the liquid fuel, feeding selectively an air or air-fuel mixture into said chamber when the liquid fuel is entering the tubular electrode and until the pressure in the chamber exceeds that of the liquid fuel feed into the tubular electrode to close it off, retaining the fuel in the tubular electrode for a time sufficient to allow the heat retained in the tubular electrode to cause the fuel therein to expand and exit as a vapor into the chamber and producing a spark between the electrodes at and during the time the fuel vapor is exiting into the chamber to ignite the fuel vapor admixture with air in the chamber at that time to produce the power stroke, and providing *at least one* restricting [areas] *area* in the tubular electrode at *a* selected [points] *point* along its length to provide *a* quench [zones] *zone* and thereby control the heat sufficient to allow the fuel to exit as a vapor into the combustion chamber.

28. The method of claim 18 wherein the internal combustion engine is a two-cycle engine and wherein the fuel is fed into the tubular electrode after the air and exhaust ports of the engine are open, the feed of fuel to the tubular electrode is stopped during the compression stroke of the piston and the fuel exits as a vapor into the combustion chamber at that time.

29. The method of claim 18 wherein the internal combustion engine is a rotary engine having a rotor of substantially triangular cross-section rotating in a stator having air-fuel inlet and exhaust gas outlet ports, and wherein the fuel is fed into the tubular electrode during the compression phase, the fuel feed to the tubular electrode stopping before the end of compression phase and existing as a vapor into the stator towards the end of the compression phase.

30. A method of operating an internal combustion engine comprised of providing a heat conductive tube having an exit end extending and opening into the combustion chamber, and having a first, larger inside diameter extending inwardly a predetermined distance from said exit end and a second, smaller inside diameter thereafter, *providing a confining zone around said exit end,* feeding only liquid fuel into the inlet end of said tube adjacent its other end at a temperature less than that generated in the chamber, allowing the liquid fuel to flow into the tube only, and until the pressure in the chamber exceeds that of the liquid fuel feed into the tube to close it off, retaining the fuel in the tube for a time sufficient to permit the heat stored in the tube which was acquired from the heat of combustion in the combustion chamber and in the tube to be transferred to the liquid fuel to change less than all of said fuel to a vapor state and thereby expand in the tube and exit therefrom only as a vapor into the confining zone in the chamber containing air or air-fuel mixture and igniting the fuel vapor-air mixture adjacent the exit end of the tube to produce power.

31. A method of operating an internal combustion engine comprised of providing a heat conductive tube having an exit end extending and opening into the combustion chamber, providing a confining zone around said exit end, feeding only fuel into the inlet end of said tube adjacent its other end at a temperature less than that generated in the chamber, allowing the fuel to flow into the tube only, and until the pressure in the chamber exceeds that of the fuel feed into the tube to close it off, retaining the fuel in the tube for a time sufficient to permit the heat stored in the tube which was acquired from the heat of combustion in the combustion chamber and in the tube to be transferred to the fuel to expand it in the tube and force it as a vapor into the confining zone in the combustion chamber selectively containing air or air-fuel mixture and igniting the fuel vapor-air mixture adjacent the exit end of the tube to produce power.

32. The method of claim 31 and providing a confining zone circumferentially about the exit end of the tube, a portion of said confining zone opening to the combustion chamber.

33. A method of operating an internal combustion engine having multiple combustion chambers comprised of providing a heat conductive tube for each chamber having an exit end extending and opening into the combustion chamber, feeding only fuel into the inlet end of said tube adjacent its other end at a temperature less than that generated in the chamber, allowing the fuel to flow into the tube only, and until the pressure in the chamber exceeds that of the fuel feed into the tube to close it off, retaining the fuel in the tube for a time sufficient to permit the heat stored in the tube which was acquired from the heat of combustion in the combustion chamber and in the tube to be transferred to the fuel to expand it in the tube and force it as a vapor into the confining zone in the combustion chamber selectively containing air or air-fuel mixture, igniting the fuel vapor-air mixture adjacent the exit end of the tube to produce power and varying the quantity of fuel supplied to each tube to equalize the power output of each chamber.

34. In a method of operating an internal combustion engine, the steps of providing an elongated electrically conductive fuel vapor injecting zone having an exit end opening into the combustion zone of the engine, confining the exit end with a portion thereof opening into the combustion zone feeding liquid fuel into the injecting zone only in response to a drop in pressure in the combustion zone, selectively feeding air or an air-fuel mixture into the combustion zone when the fuel is entering the injecting zone until the pressure in the combustion zone rises sufficiently to close off the fuel feed, allowing the heat of combustion of the combustion zone and the heat of combustion in the injecting zone to heat the injecting zone for a time sufficient to cause the fuel to vaporize and to expand and thereby be injected into the confining zone as a vapor and producing a spark from the exit end of the injecting zone to another electrode at and during the time the fuel is exiting as a vapor into the combustion zone to ignite the fuel vapor admixture with the air or air-fuel mixture at that time to produce the power stroke of the engine.

35. In a method of operating an internal combustion engine, the steps of providing an elongated electrically conductive fuel vapor injecting zone having an exit end opening into the combustion zone of the engine, feeding only fuel into the injecting zone only in response to a drop in pressure in the combustion zone, confining the exit end with a portion thereof opening into the combustion zone selectively feeding air or an air-fuel mixture into the combustion zone when the fuel is entering the injecting zone until the pressure in the combustion zone rises sufficiently to close off the fuel feed, allowing the heat of combustion of the combustion zone and the heat of combustion of the injecting zone to heat the injecting zone for a time sufficient to expand the fuel therein and cause it to be injected into the confining zone to another electrode as a vapor, and producing a spark from the exit end of the injecting zone at and during the time the fuel is exiting as a vapor into the combustion zone to ignite the fuel vapor admixture with the air or air-fuel mixture at that time to produce the power stroke of the engine.

* * * * *

UNITED STATES PATENT AND TRADEMARK OFFICE

CERTIFICATE OF CORRECTION

PATENT NO. : RE 29,978

DATED : May 1, 1979

INVENTOR(S) : Ervin Leshner & Michael D. Leshner

It is certified that error appears in the above-identified patent and that said Letters Patent are hereby corrected as shown below:

In the ABSTRACT, line 12, after "nitrogen" insert -- , --.

In the CLAIMS, claim 18, column 15, line 6, after "one" insert -- a first and a second end, said first --.

In the CLAIMS, claim 18, column 15, line 11, before "disposing" insert -- the interior of said conductive member having a first, larger cross-sectional area adjacent said first end and a second, smaller cross-sectional area between said first area and said second end, --.

In the CLAIMS, claim 18, column 15, line 12, delete "one".

In the CLAIMS, claim 18, column 15, line 13, after "feeding" insert -- only --.

UNITED STATES PATENT AND TRADEMARK OFFICE

CERTIFICATE OF CORRECTION

PATENT NO. : RE 29,978

DATED : May 1, 1979

INVENTOR(S) : Ervin Leshner & Michael D. Leshner

It is certified that error appears in the above-identified patent and that said Letters Patent are hereby corrected as shown below:

In the CLAIMS, claim 18, column 15, line 14, delete "other" insert -- second --.

In the CLAIMS, claim 30, column 16, lines 42-45, "and having a first, larger inside diameter extending inwardly a predetermined distance from said exit end and a second, smaller inside diameter thereafter," should be in italics.

In the CLAIMS, claim 30, column 16, line 46, "only" should be in italics.

In the CLAIMS, claim 30, column 16, line 55, after "change" insert -- [it] -- with the brackets.

In the CLAIMS, claim 30, column 16, line 55, "less than all of said fuel" should be in italics.

UNITED STATES PATENT AND TRADEMARK OFFICE

CERTIFICATE OF CORRECTION

PATENT NO. : RE 29,978

DATED : May 1, 1979

INVENTOR(S) : Ervin Leshner & Michael D. Leshner

It is certified that error appears in the above-identified patent and that said Letters Patent are hereby corrected as shown below:

In the CLAIMS, claim 30, column 16, line 57, "only" should be in italics.

Signed and Sealed this

*Twenty-fifth* Day of *September 1979*

[SEAL]

*Attest:*

*Attesting Officer*

LUTRELLE F. PARKER

*Acting Commissioner of Patents and Trademarks*